(12) United States Patent
Naylor-Teece et al.

(10) Patent No.: US 11,003,572 B2
(45) Date of Patent: May 11, 2021

(54) TRAFFIC-BASED MUTATION/COVERAGE TESTING REQUIREMENTS

(71) Applicant: International Business Machines Corporation, Armonk, NY (US)

(72) Inventors: Alexander John Naylor-Teece, Newbury (GB); Samuel Christopher Smith, Eastleigh (GB); Oliver Paul Masters, Birmingham (GB); Andrew James Dunnings, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/567,093

(22) Filed: Sep. 11, 2019

(65) Prior Publication Data

US 2021/0073109 A1 Mar. 11, 2021

(51) Int. Cl.
*G06F 11/36* (2006.01)
*G06F 8/65* (2018.01)
(Continued)

(52) U.S. Cl.
CPC ........ *G06F 11/3676* (2013.01); *G06F 11/302* (2013.01); *G06F 11/3616* (2013.01);
(Continued)

(58) Field of Classification Search
CPC .............. G06F 11/3676; G06F 11/302; G06F 11/3684; G06F 11/3692; G06F 11/3664; G06F 11/3616; G06F 11/3003; G06F 11/3452; G06F 11/3608; G06F 11/3604; G06F 11/3672; G06F 11/3688;
(Continued)

(56) References Cited

U.S. PATENT DOCUMENTS 8,539,282 B1 * 9/2013 Kabanov ............. G06F 11/3688
714/38.1
9,489,290 B1 * 11/2016 Boissy ................ G06F 11/3688
(Continued)

FOREIGN PATENT DOCUMENTS

WO 20150717781 W 5/2015

OTHER PUBLICATIONS

Collin McMillan et al., Portfolio: Finding Relevant Functions and Their Usages, May 21-28, 2011, [Retrieved on Dec. 1, 2020]. Retrieved from the internet: <URL: https://dl.acm.org/doi/pdf/10.1145/1985793.1985809> 8 Pages (111-120) (Year: 2011).*

(Continued)

*Primary Examiner* — Anibal Rivera
(74) *Attorney, Agent, or Firm* — VanLeeuwen & VanLeeuwen; Alexander G. Jochym (57) ABSTRACT

An approach is provided in which the approach captures usage data corresponding to multiple users accessing a codebase that includes multiple code lines. The approach uses the captured usage data to compute a code line usage weighting for at least one of the code lines. The approach also computes a code line test coverage score for at least one code line based on at least one current software test program that tests the codebase. The approach compares the code line usage weighting against the code line test coverage score and flags the code line based on the comparison.

17 Claims, 6 Drawing Sheets

(51) Int. Cl.
  *G06F 9/44* (2018.01)
  *G06F 11/30* (2006.01)
  *G06F 11/34* (2006.01)
  *G06F 8/70* (2018.01)
  *G06F 21/62* (2013.01)
(52) U.S. Cl.
  CPC ...... *G06F 11/3664* (2013.01); *G06F 11/3684* (2013.01); *G06F 11/3692* (2013.01); *G06F 8/65* (2013.01); *G06F 8/70* (2013.01); *G06F 11/3003* (2013.01); *G06F 11/3452* (2013.01); *G06F 11/3604* (2013.01); *G06F 11/3608* (2013.01); *G06F 11/3672* (2013.01); *G06F 21/6218* (2013.01)
(58) Field of Classification Search
  CPC ........ G06F 11/368; G06F 16/955; G06F 8/10; G06F 8/65; G06F 8/60; G06F 8/70; G06F 8/30; G06F 9/45533; G06F 21/6218; G06F 16/953; G06F 16/35; G06F 8/71
  See application file for complete search history.

(56) References Cited

U.S. PATENT DOCUMENTS

| | | | | |
|---|---|---|---|---|
| 9,495,642 | B1* | 11/2016 | Smith | G06F 11/3692 |
| 9,552,285 | B2 | 1/2017 | Godefroid | |
| 9,946,633 | B2* | 4/2018 | Atyam | G06F 11/3616 |
| 10,394,700 | B1* | 8/2019 | Unsal | G06F 11/3684 |
| 10,423,403 | B1* | 9/2019 | Natarajan | G06K 9/344 |
| 2008/0154710 | A1* | 6/2008 | Varma | G06Q 10/00 717/104 |
| 2012/0110544 | A1* | 5/2012 | Novak | G06F 8/70 717/101 |
| 2013/0024842 | A1* | 1/2013 | Browne | G06F 11/3692 717/125 |
| 2013/0340076 | A1* | 12/2013 | Cecchetti | G06F 21/6218 726/23 |
| 2014/0047413 | A1* | 2/2014 | Sheive | G06F 8/30 717/110 |
| 2015/0254151 | A1* | 9/2015 | Baril | G06F 11/3003 702/182 |
| 2015/0254161 | A1* | 9/2015 | Baril | G06F 11/3616 717/124 |
| 2015/0254162 | A1* | 9/2015 | Baril | G06F 16/955 717/128 |
| 2015/0254163 | A1* | 9/2015 | Baril | G06F 11/3452 714/38.1 |
| 2015/0254165 | A1* | 9/2015 | Baril | G06F 11/3664 714/38.1 |
| 2015/0254172 | A1* | 9/2015 | Baril | G06F 11/3616 717/128 |
| 2015/0293837 | A1* | 10/2015 | Rajamanickam | G06F 11/3676 717/130 |
| 2016/0004629 | A1 | 1/2016 | Bharara | |
| 2016/0162392 | A1* | 6/2016 | Hu | G06F 11/3684 714/38.1 |
| 2017/0091078 | A1* | 3/2017 | Atyam | G06F 11/3672 |
| 2017/0109260 | A1 | 4/2017 | Wang | |
| 2017/0249231 | A1* | 8/2017 | Bofferding | G06F 11/3604 |
| 2018/0121337 | A1* | 5/2018 | Unsal | G06N 20/00 |
| 2019/0095843 | A1* | 3/2019 | Muthuswamy | G06Q 10/06398 |
| 2019/0171438 | A1* | 6/2019 | Franchitti | G06N 5/022 |
| 2019/0171846 | A1* | 6/2019 | Conikee | G06F 21/52 |
| 2019/0294428 | A1* | 9/2019 | Scheiner | G06F 8/65 |
| 2019/0294525 | A1* | 9/2019 | Scheiner | G06F 11/3608 |
| 2019/0325353 | A1* | 10/2019 | Aftab | G06N 20/00 |
| 2020/0097390 | A1* | 3/2020 | Gunter | G06F 11/3664 |
| 2020/0117434 | A1* | 4/2020 | Biskup | G06F 8/71 |
| 2020/0134564 | A1* | 4/2020 | Reilly | G06F 11/3476 |
| 2020/0184278 | A1* | 6/2020 | Zadeh | G06F 16/953 |

OTHER PUBLICATIONS

Lian Yu et al., Testing as a Service over Cloud, 2010 IEEE, [Retrieved on Dec. 1, 2020]. Retrieved from the internet: <URL: https://ieeexplore.ieee.org/stamp/stamp.jsp?arnumber=5569908> 8 Pages (181-188) (Year: 2010).*

"Istanbul—a JS code coverage tool written in JS," GitHub, May 2017, 6 pages.

"Mutation testing," wikipedia.org, Jun. 2019, 6 pages.

"Java Performance Tuning," Question of the month:—Xprof, Fasterj. com, May 2019, 2 pages.

* cited by examiner

TRAFFIC-BASED MUTATION/COVERAGE TESTING REQUIREMENTS

BACKGROUND

Software testing involves executing a software component or system component to evaluate one or more properties of interest in the software component. In general, approaches to testing the software components or system components are based on design and development requirements imposed during the build stages the software component or system component. As the number of possible tests for software components is practically unlimited, software testing requires strategy to select tests that meet limited time and resource constraints. Consequently, software components are inevitably released with a certain amount of software bugs that are not detected by the limited amount of software testing.

Test coverage describes the degree at which source code of a software component is executed when a particular software test suite executes. Many different metrics are used to calculate test coverage, such as the percentage of program subroutines, the percentage of program statements called during software test suite execution, etc. A software component with high test coverage percentage indicates that the software component has more of its source code executed during software testing. As such, the high test coverage percentage suggests that the software component has been thoroughly tested and has a low change of being released with software bugs.

BRIEF SUMMARY

According to one embodiment of the present disclosure, an approach is provided in which the approach captures usage data corresponding to multiple users accessing a codebase that includes multiple code lines. The approach uses the captured usage data to compute a code line usage weighting for at least one of the code lines. The approach also computes a code line test coverage score for at least one code line based on at least one current software test program that tests the codebase. The approach compares the code line usage weighting against the code line test coverage score and flags the code line based on the comparison.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
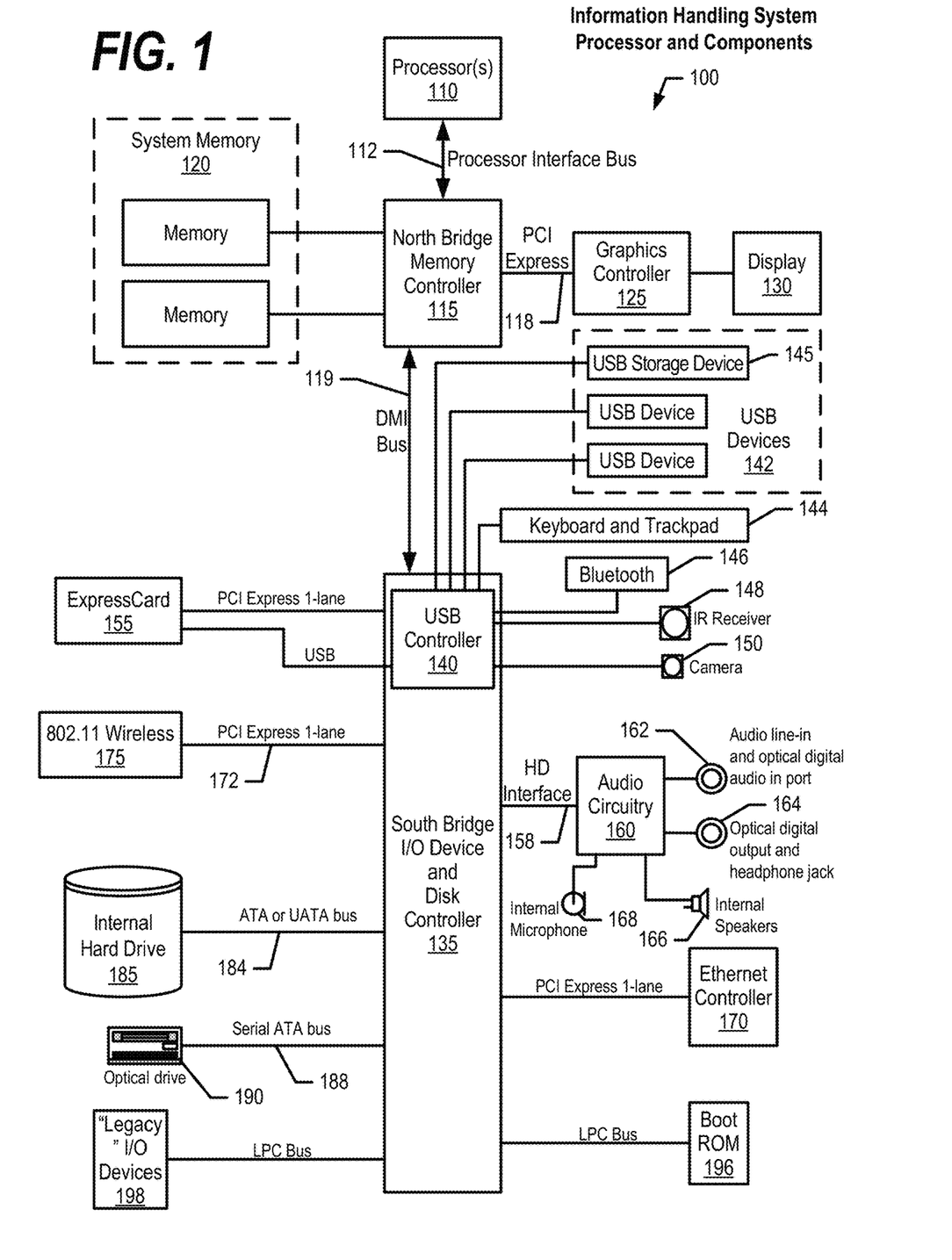
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
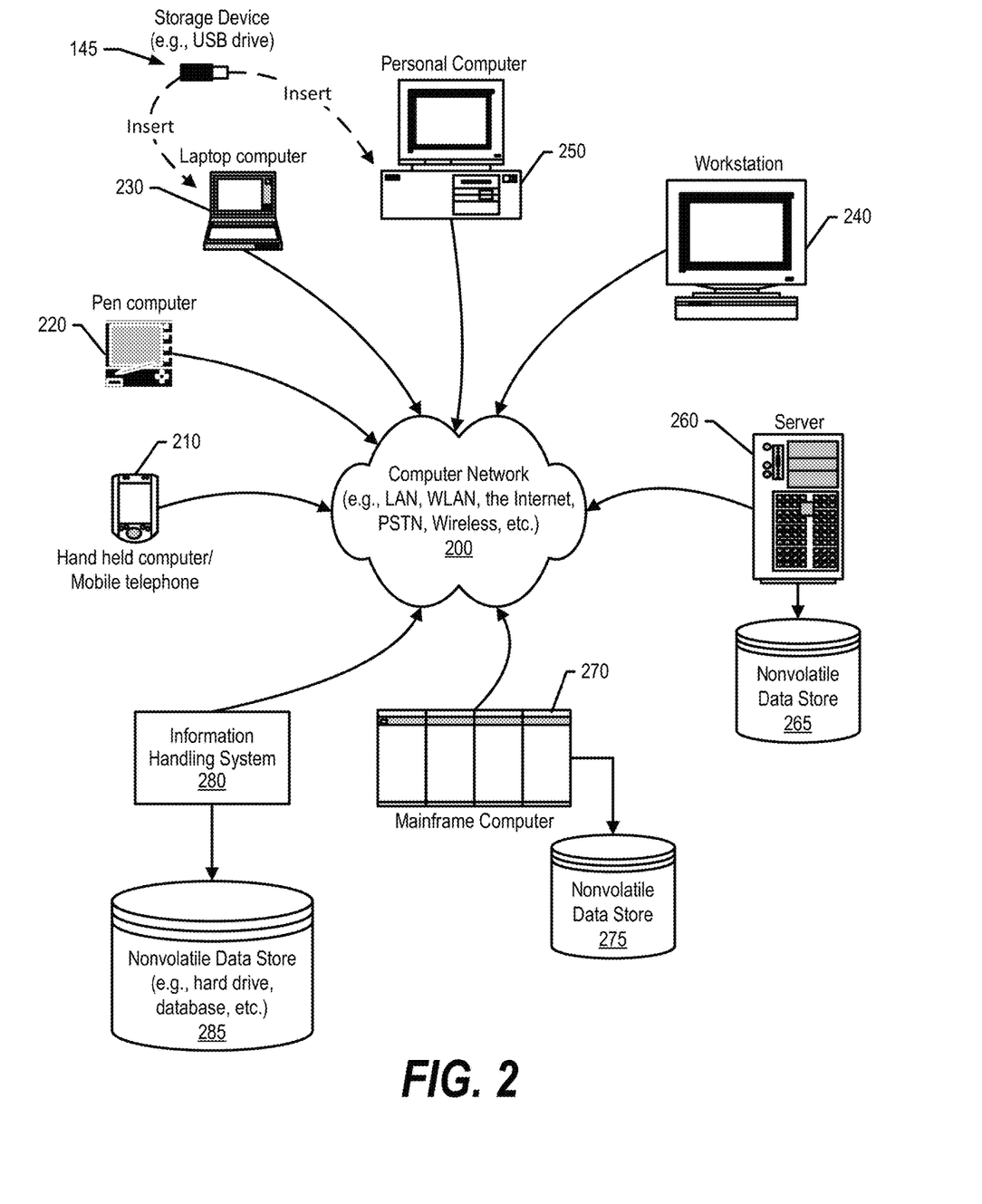
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, various metrics are used to calculate software test coverage. A challenge found with existing approaches, however, is that the existing approaches treat each line of code in a codebase with equal weighting and, therefore, existing approaches do not identify highly utilized code lines that are under tested by current software tests. As defined herein, a codebase is a collection of source code used to build a particular software system, application, or software component, which includes a microservice in a microservice architecture.

FIGS. 3 through 7 depict an approach that can be executed on an information handling system that assigns individual weightings to individual code lines and evaluates whether existing test coverage adequately tests each of the code lines in a codebase based on an actual user utilization rate of the codebase. In one embodiment, the approach utilizes coverage tools and uses an ability to reroute traffic within a system using a custom load balancer or proxy to capture real-time user usage patterns. The results of the usage analysis are used to determine which areas of the codebase should be tested more thoroughly and include coverage requirements and mutation testing thresholds for these components being made proportionally higher than less critical areas (less utilized) of the codebase.

In one embodiment, the approach combines different parts of the codebase used by users with traditional test coverage and/or mutation testing techniques, which allows developers to have a more accurate level of confidence in their tests. In another embodiment, the approach evaluates a microservice in a microservice architecture and determines whether portions of the microservice require increased testing.

Figure 3:
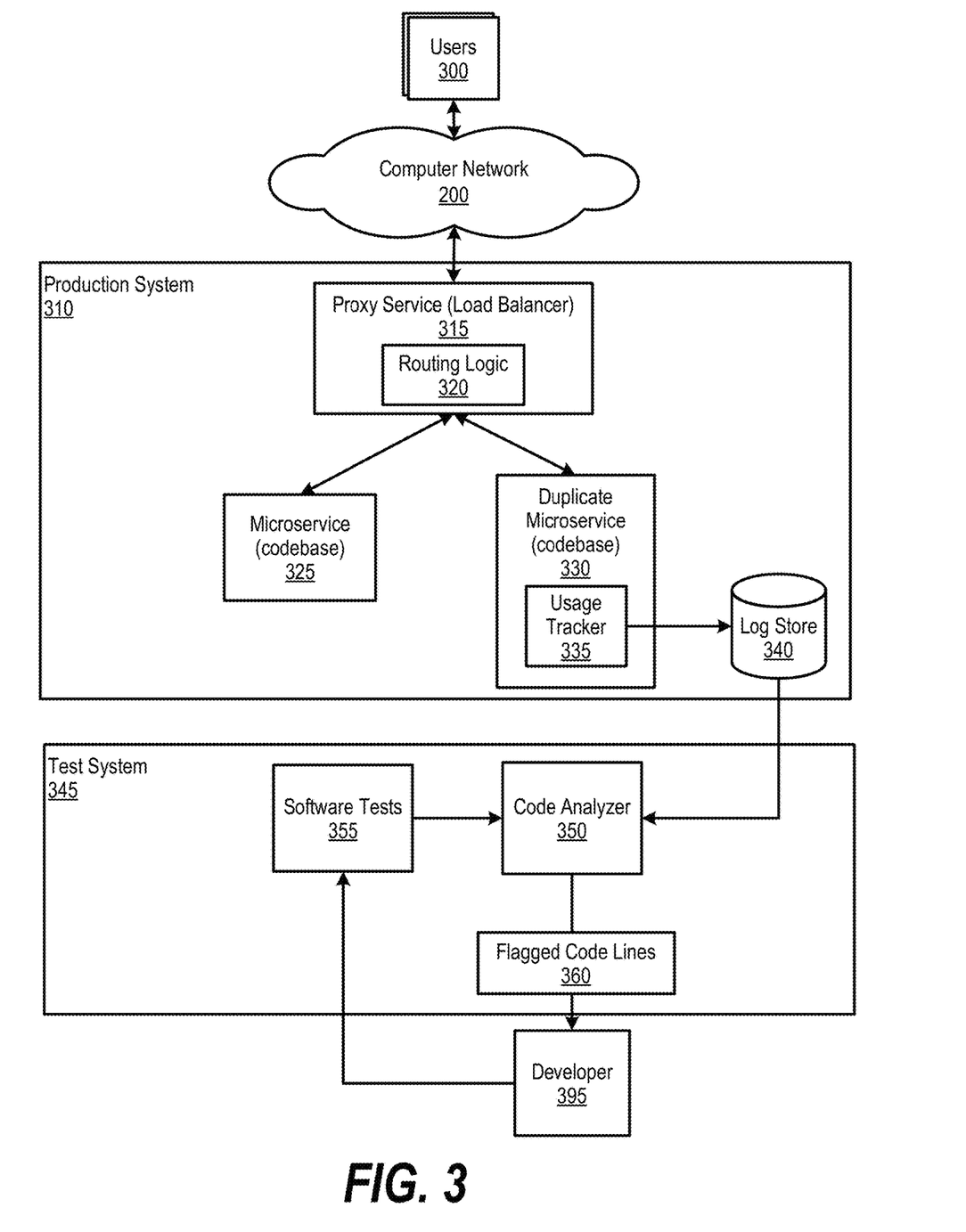
FIG. 3 is an exemplary diagram depicting a code analyzer comparing actual usage data against current software test coverages and flagging code lines that have a discrepancy between a code line's importance and its test coverage.

FIG. 3 is an exemplary diagram depicting a code analyzer 350 comparing actual usage data against current software test coverages and flagging code lines that have a discrepancy between a code line's importance (usage) and its test coverage.

Production system 310 includes microservice 325 (e.g., codebase) and interacts with users 300 through computer network 200. In one embodiment, the approach creates duplicate microservice 330 (or a duplicate codebase) and adds routing logic 320 to proxy service 315 that occasionally routes a user to duplicate microservice 330 rather than the original microservice 325. Routing logic 320 may be configured to redirect a percentage of the user requests (e.g., 1%) to duplicate microservice 330. In one embodiment, the proportion is small to minimize overall disruption to users 300 because, for example, duplicate microservice 330 may take longer to process requests due to the additional debugging features (usage tracker 335). Since production system 310 has a high throughput of users, a small percentage of users redirected to duplicate microservice 330 ensure that a large data sample is captured.

Usage tracker 335 collects usage data from users 300 accessing duplicate microservice 330 and stores the usage data in log store 340. In one embodiment, usage tracker 335 includes debugging symbols, logging, and/or code coverage libraries. In this embodiment, instead of modifying the original codebase or service, the advantage of using duplicate codebase or a duplicate microservice is that the user experience is not significantly impacted since a small proportion of the users are accessing the duplicate service whose performance may be slightly degraded due to the added tracking features.

When an acceptable amount of usage data is collected, code analyzer 350 retrieves the usage data from log store 340 and begins to analyze the collected usage data. In one embodiment, if usage tracker 335 uses debugging symbols and logging instead of a coverage library, code analyzer 350 analyzes the output of each logged encounter to determine which areas of the code were used. In this embodiment, code analyzer 350 runs through each log and allocates each line to a "bucket" that corresponds to the area of the code that produced the log since it is known what line of code produced each log. In turn, code analyzer 350 builds up a count per function at a more fine-grained level (per code line).

In one embodiment, code analyzer 350 weights the usage based on user types. For example, in a production system, the user experience of a paid user would likely take precedence over that of an unpaid user. As such, the code paths taken by a paid user are weighted higher than code paths taken by an unpaid user. This ensures that elements of the system that are used more by paid users are more thoroughly tested than those used by unpaid users. In this embodiment, routing logic 320 is configured to route a certain percentage of paid users to duplicate microservice 330 and route a different percentage of unpaid users to duplicate microservice 330.

Figure 5:
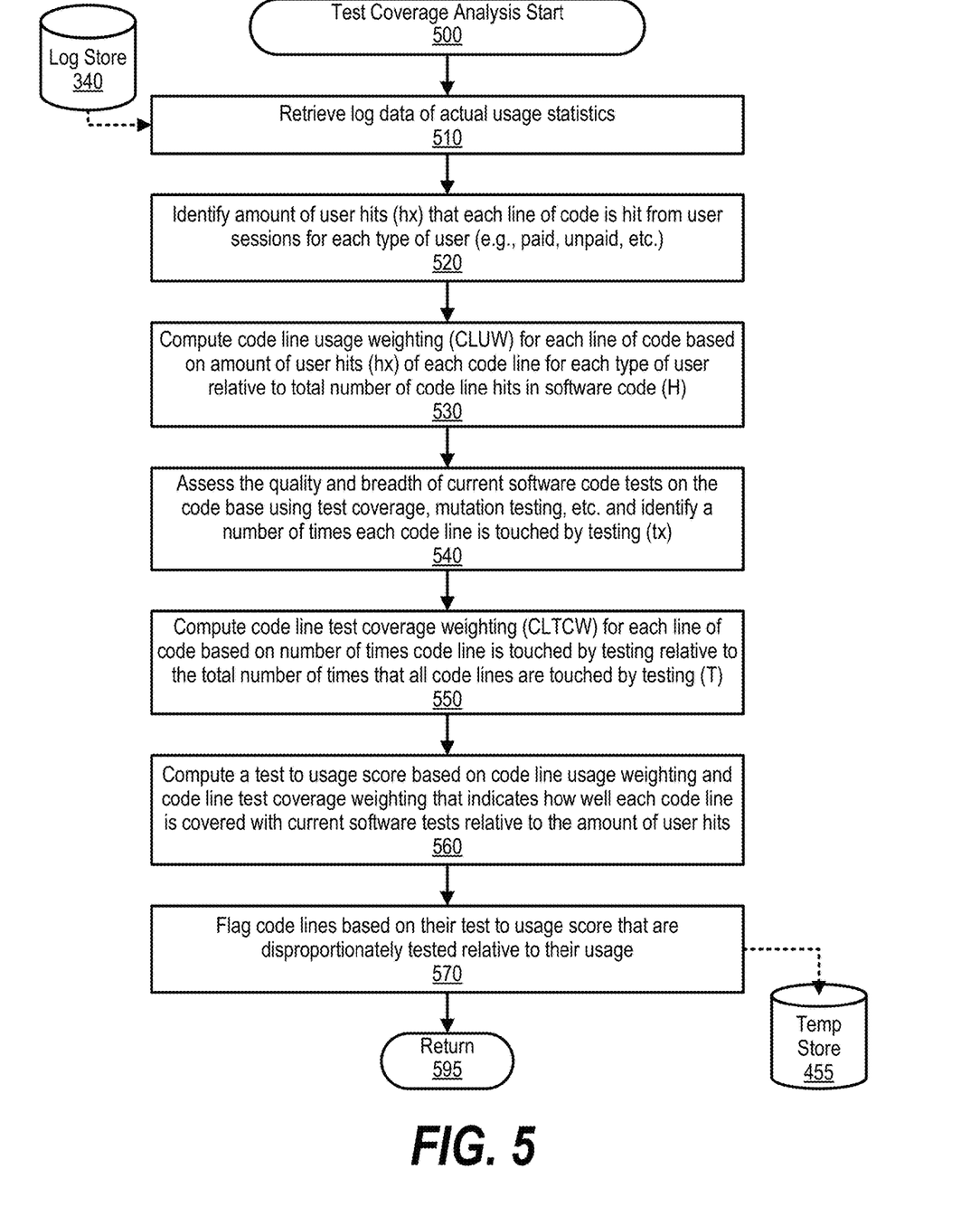
FIG. 5 is an exemplary flowchart depicting steps taken to compute a test to usage score to identify code lines that are disproportionately tested relative to their actual usage.

Code analyzer 350 identifies a number of user hits (hx) that each line of code is hit from user sessions for each type of user (e.g., paid, unpaid, etc.) and computes a code line usage weighting (CLUW) for each line of code based on the number of user hits of each code line for each type of user relative to the total number of code line hits in the codebase (H) (see FIG. 5 and corresponding text for further details).

Code analyzer 350 assesses the quality and breadth of current codebase tests on the code base using test coverages, mutation testing, etc., and identifies a number of times that each code line is touched by testing (tx). Code analyzer 350 then computes a code line test coverage weighting (CLTCW) for each line of code based on the number of times that a particular code line is touched by testing relative to the total number of times that all code lines are touched by testing (see FIG. 5 and corresponding text for further details).

Code analyzer 350 computes a test to usage score for each code line based on the computed code line usage weighting (CLUW) and the code line test coverage weighting (CLTCW). The test to usage score indicates how well each code line is tested with current software tests relative to the amount of user hits of the code line:

$$\text{Test to Usage Score} = CLUWx/CLTCWx = (hx/H)/(tx/T) = (hx*T)/(tx*H)$$

In one embodiment, the computations discussed above are illustrative and can be generalized to be any function that is weakly increasing in h and weakly decreasing in t. In another embodiment, the code line usage weightings are normalized and the code line test coverage weightings are normalized. In this embodiment, the normalized weightings are compared against each other and code analyzer 350 flags code lines that have normalized weightings that differ within a predefined range (e.g., +/−20%).

Code analyzer 350 then flags code lines based on their test to usage score that are disproportionately tested relative to their usage (flagged code lines 360). In one embodiment, out of a scale from 0-100, a test to usage score of 50 indicates a balanced amount of test coverage to actual usage. In this embodiment, a score range from 40-60 for a particular code line is considered proportionate test coverage. However, a score from 0-39 for a particular code line indicates that the code line has a high number of tests relative to its usage statistics. And, a score from 61-100 for a particular code line indicates that the code line has a low number of tests relative to its usage statistics (see FIG. 6 and corresponding text for further details). Code analyzer 350 sends flagged code lines 360 to developer 395 for further analyzing, such as indication for developer 395 to increase or decrease the test coverage of specific code lines.

In one embodiment, code analyzer 350 generates a heatmap of routes through the code that is based on the captured actual usage data and, as such, is more beneficial than simulated statistics. In this embodiment, code analyzer 350 determines critical areas of the code based on the heatmap and takes action to ensure that these critical areas of the code are tested to a higher standard than other areas (see FIG. 5 and corresponding text for further details). In one embodiment, code analyzer 350 ensures that the code coverage of the tests for these components is higher than usual by increasing the mutation testing threshold for these components. The increased test coverage results in a more robust system that is less likely to include software bugs in critical components of the system, therefore ensuring greater uptime.

The approach discussed herein also adapts to changes in customer demand by exposing duplicate microservices multiple times to perform continual analysis. In one embodiment, single components in a microservice architecture are instrumented with usage tracker 335 one at a time to minimize the risk of affecting the overall quality of service.

Figure 4:
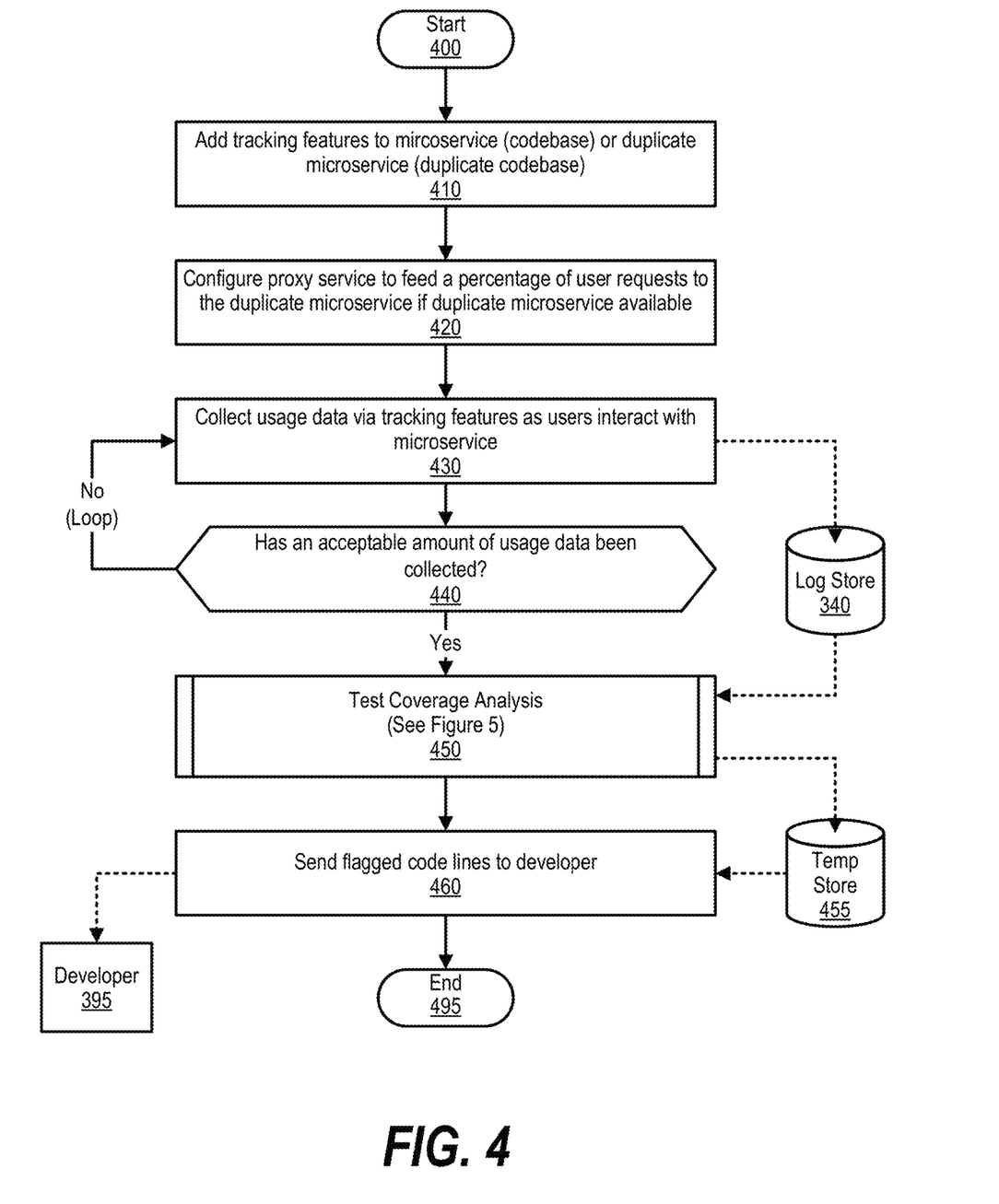
FIG. 4 is an exemplary flowchart depicting steps taken to flag code lines that are disproportionately tested based on actual usage data.

FIG. 4 is an exemplary flowchart depicting steps taken to flag code lines that are disproportionately tested based on actual usage data. As discussed herein, software code lines may be under tested when a code line is rarely tested during software test but is heavily accessed during user operation. Likewise, a software code line may be over tested when a code line is heavily tested but is infrequently accessed during user operation. In the latter, the approach discussed herein allows a developer to remove unneeded testing to reduce software test times.

FIG. 4 processing commences at 400 whereupon, at step 410, the process adds tracking features (usage tracker 335) to a microservice under evaluation. In one embodiment, the process creates a duplicate microservice and adds the tracking features to the duplicate microservice instead of the original microservice. In another embodiment, in a traditional computer system, the process adds tracking features to a codebase under test. In this embodiment, the process may duplicate the codebase depending on resource constraints and add the tracking features to the duplicate codebase instead of the original codebase.

At step 420, the process configures proxy service 315 to feed a percentage of user requests, such as 10% of the user requests, from users 300 to duplicate microservice 330 (if the process created a duplicate microservice). At step 430, the process collects usage data via usage tracker 335 as users 300 access duplicate microservice 330, and stores the usage data in log store 340. In one embodiment, usage tracker 335 also logs the type of user, such as an unpaid user or a paid user. In another embodiment, the process collects the usage data using techniques such as profiling, stack traces, log analysis, etc.

The process determines as to whether the amount of collected usage data has reached a threshold, such as based on the amount of user accesses according to user type, a timeframe window, etc. (decision 440). If the process has not yet collected an acceptable amount of usage data, then decision 440 branches to the 'no' branch which loops back to continue to collect usage data. This looping continues until the process has collected an acceptable amount of usage data, at which point decision 440 branches to the 'yes' branch exiting the loop.

At predefined process 450, the process assigns code line usage weightings (CLUW) to each code line, assigns code line test weightings (CLTCW) to each code line based on current test coverage, and computes a test to usage score to identify code lines having a disproportionate amount of testing relative to their usage data (see FIG. 5 and corresponding text for processing details). The process stores the evaluation results in temporary store 455.

Based on the evaluation results in temporary store 455, the process, at step 460, sends flagged code lines to developer 395. In turn, developer 395 increases test coverage of under tested code lines and/or decreases test coverage of over tested code lines. In one embodiment, the process generates new software tests to increase test coverage and adds the new software tests to software tests 355. FIG. 4 processing thereafter ends at 495.

FIG. 5 is an exemplary flowchart depicting steps taken to assign code line usage weightings to each code line, assign code line test weightings to each code line based on current test coverages, and compute a test to usage score that identifies code lines that are disproportionately tested relative to their actual usage.

FIG. 5 processing commences at 500 whereupon, at step 510, the process retrieves log data from log store 340 that includes actual usage data collected during steps shown in FIG. 4. At step 520, the process identifies an amount of user hits (hx) for each code line from each type of user (e.g., paid, unpaid, etc.). In one embodiment, if usage tracker 335 provided usage details on a function level, the process assigns each lines in an individual function the same amount of hits each time the function was accessed. In another embodiment, if the process utilizes log analysis, the process assigns extra hits to each line of code within the same code path of a given log each time the given log is present in the logs.

At step 530, the process computes, in one embodiment, a code line usage weighting (CLUW) for each line of code based on the number of user hits of each code line (hx) for each type of user relative to the total number of code line hits in the codebase (H):

$hx = \#$ user hits on code line $x$ $H = \Sigma h$ $CLUW_x = h_x/H$

For example, if code line x incurred 50 hits and the total amount of hits across all code lines is 200, the CLUW for code line x is 50/200=0.25.

Next, at step 540, the process assesses the quality and breadth of current codebase tests on the codebase using test coverages, mutation testing, etc., and identifies a number of times for each code line that the code line is touched by testing (tx). At step 550, in one embodiment, the process computes a code line test weighting (CLTCW) for each line of code based on the number of times that a particular code line is touched by testing (tx) relative to the total number of times that all code lines are touched by testing (T):

$tx = \#$ times code line $x$ touched by testing $T = \Sigma t$ $CLTCW_x = tx/T$ For example, if code line x incurred 10 hits during testing and the total amount of hits across all code lines is 2000, the CLTCW for code line x is 10/2000=0.005.

At step 560, the process computes a test to usage score for each code line based on the computed code line usage weighting (CLUW) and the code line test weighting (CLTCW). The test to usage score indicates how proportionate each code line is tested with current software tests relative to the amount of user hits of the code line:

Test to Usage Score=$CLUW_x/CLTCW_x = (hx/H)/(tx/T) = (hx*T)/(tx*H)$

Continuing with the example, above, the test to usage score for code line x=0.25/0.005=50. The computations above are illustrative and can be generalized to be any function:

$f: \mathbb{R} \times \mathbb{N} \rightarrow \mathbb{R}$, which is weakly increasing in $h$ and weakly decreasing in $t: wEnF$ $f(w,n) \rightarrow W \times N$ As discussed herein, identifying individual code lines that are disproportionately tested relative to their actual usage is valuable as it allows developers to have a more realistic idea of the quality, as well as breadth, of their current software tests. In turn, developers have greater test coverage confidence when creating changes and quickly releasing software.

At step 570, the process flags code lines based on their test to usage score that are disproportionately tested relative to their usage. In one embodiment, out of a scale from 0-100, a test to usage score of 50 indicates a balanced amount of test coverage to actual usage. In this embodiment, a score range from 40-60 for a particular code line is considered proportionate test coverage. However, a score from 0-39 for a particular code line indicates that the code line has a high number of tests relative to its usage statistics. And, a score from 61-100 for a particular code line indicates that the code line has a low number of tests relative to its usage statistics (see FIG. 6 and corresponding text for further details). The process stores the flagged indicators in temp store 455 and FIG. 5 processing thereafter returns to the calling routine (see FIG. 4) at 595.

Figure 6:
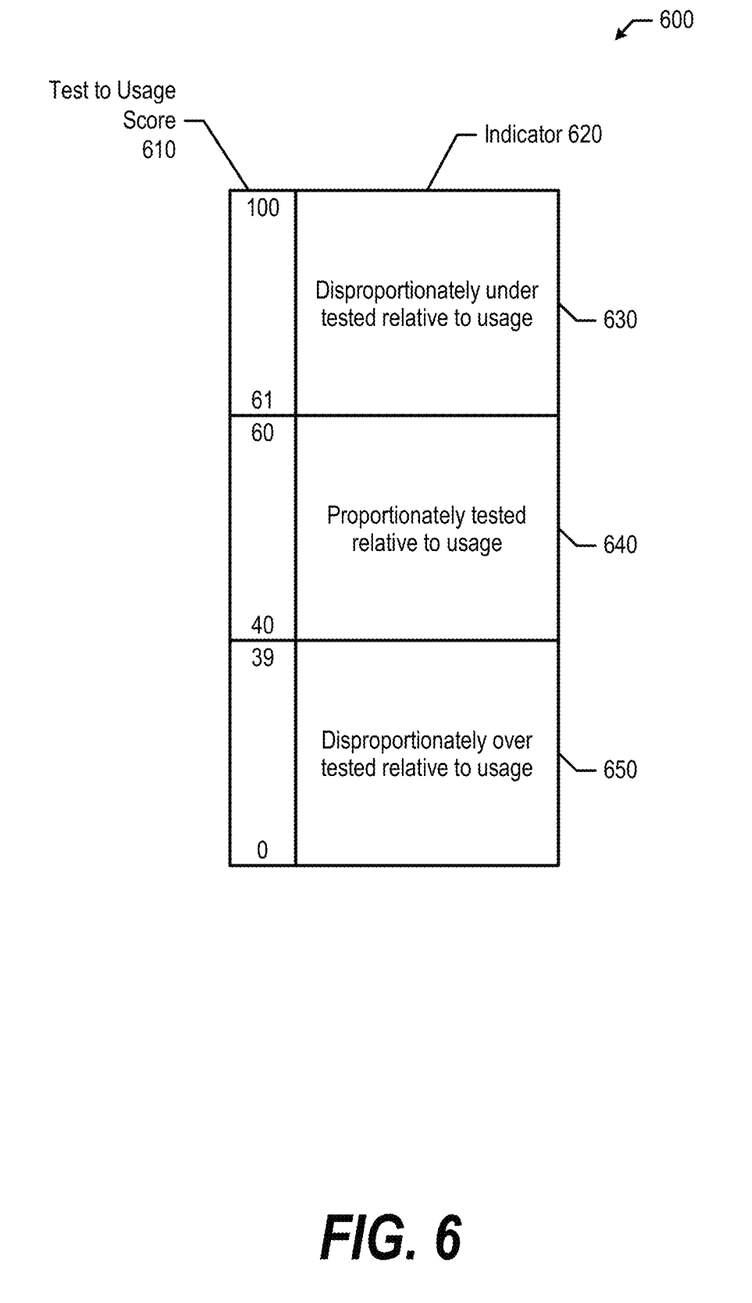
FIG. 6 is an exemplary diagram depicting test to usage score ranges that indicate whether a code line requires more or less testing relative to its actual usage.

FIG. 6 is an exemplary diagram depicting test to usage score ranges that indicate whether a code line requires more or less testing relative to its actual usage. Diagram 600 includes test to usage score ranges 610 and corresponding indicators 620. In one embodiment, the score ranges are based on a different scale, such as a normalized range from 0.0-1.0.

When a code line's corresponding test to usage score is in range 640, the code line is proportionately tested and no further action is required. However, when the code line's corresponding test to usage score is in range 630, the code line is disproportionately under tested and the code line flag indicates that developer 395 should add additional tests to test the code line. In one embodiment, test system 345 generates new software tests to increase test coverage of the under tested code lines and adds the new software tests to software tests 355. Similarly, when the code line's corresponding test to usage score is in range 650, the code line is disproportionately over tested and the code line flag indicates that developer 395 could reduce the amount of tests to test the code line if applicable. In one embodiment, test system 345 removes some of the software tests in software tests 355 that test code lines having a test to usage score in range 650.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
capturing usage data corresponding to a plurality of users accessing a codebase comprising a plurality of code lines, wherein the capturing further comprises:
duplicating the codebase;
adding usage tracking logic to the duplicated codebase;
routing a portion of the plurality of users to the duplicated codebase; and
capturing, by the usage tracking logic, the usage data based on the portion of the plurality of users accessing the duplicated codebase;
computing, based on the captured usage data, a code line usage weighting for at least one of the plurality of code lines;
computing a code line test coverage score for the at least one code line based on at least one current software test program that tests the codebase; and
flagging the at least one code line in response to comparing the code line usage weighting against the code line test coverage score.

2. The method of claim 1 wherein the codebase is a microservice and the duplicated codebase is a duplication of the microservice.

3. The method of claim 1 further comprising:
classifying each of the plurality of users as one of a plurality of user types;
assigning a user type weighting to each of the plurality of user types; and
using the assigned user type weighting in the computing of the code line usage weighting.

4. The method of claim 3 further comprising:
generating a heatmap of a set of routes through the codebase based on the usage data, wherein each of the set of routes identify one of the plurality of user types; and
flagging a different one of the plurality of code lines based on the heatmap.

5. The method of claim 1 wherein the flagging indicates that the at least one code line is under tested in response to determining that the code line usage weighting of the at least one code line is greater than the code line test coverage score of the at least one code line.

6. The method of claim 1 wherein the flagging indicates that the at least one code line is over tested in response to determining that the code line usage weighting of the at least one code line is less than the code line test coverage score of the at least one code line.

7. An information handling system comprising:
one or more processors;
a memory coupled to at least one of the processors;
a set of computer program instructions stored in the memory and executed by at least one of the processors in order to perform actions of:
capturing usage data corresponding to a plurality of users accessing a codebase comprising a plurality of code lines, wherein the capturing further comprises:
duplicating the codebase;
adding usage tracking logic to the duplicated codebase;
routing a portion of the plurality of users to the duplicated codebase; and
capturing, by the usage tracking logic, the usage data based on the portion of the plurality of users accessing the duplicated codebase;
computing, based on the captured usage data, a code line usage weighting for at least one of the plurality of code lines;
computing a code line test coverage score for the at least one code line based on at least one current software test program that tests the codebase; and flagging the at least one code line in response to comparing the code line usage weighting against the code line test coverage score.

8. The information handling system of claim 7 wherein the codebase is a microservice and the duplicated codebase is a duplication of the microservice.

9. The information handling system of claim 7 wherein the processors perform additional actions comprising:
classifying each of the plurality of users as one of a plurality of user types;
assigning a user type weighting to each of the plurality of user types; and
using the assigned user type weighting in the computing of the code line usage weighting.

10. The information handling system of claim 9 wherein the processors perform additional actions comprising:
generating a heatmap of a set of routes through the codebase based on the usage data, wherein each of the set of routes identify one of the plurality of user types; and
flagging a different one of the plurality of code lines based on the heatmap.

11. The information handling system of claim 7 wherein the flagging indicates that the at least one code line is under tested in response to determining that the code line usage weighting of the at least one code line is greater than the code line test coverage score of the at least one code line.

12. The information handling system of claim 7 wherein the flagging indicates that the at least one code line is over tested in response to determining that the code line usage weighting of the at least one code line is less than the code line test coverage score of the at least one code line.

13. A computer program product stored in a computer readable storage medium, comprising computer program code that, when executed by an information handling system, causes the information handling system to perform actions comprising:
capturing usage data corresponding to a plurality of users accessing a codebase comprising a plurality of code lines, wherein the capturing further comprises:
duplicating the codebase;
adding usage tracking logic to the duplicated codebase;
routing a portion of the plurality of users to the duplicated codebase; and
capturing, by the usage tracking logic, the usage data based on the portion of the plurality of users accessing the duplicated codebase;
computing, based on the captured usage data, a code line usage weighting for at least one of the plurality of code lines;
computing a code line test coverage score for the at least one code line based on at least one current software test program that tests the codebase; and
flagging the at least one code line in response to comparing the code line usage weighting against the code line test coverage score.

14. The computer program product of claim 13 wherein the codebase is a microservice and the duplicated codebase is a duplication of the microservice.

15. The computer program product of claim 13 wherein the information handling system performs further actions comprising:
classifying each of the plurality of users as one of a plurality of user types;
assigning a user type weighting to each of the plurality of user types; and
using the assigned user type weighting in the computing of the code line usage weighting.

16. The computer program product of claim 15 wherein the information handling system performs further actions comprising:
generating a heatmap of a set of routes through the codebase based on the usage data, wherein each of the set of routes identify one of the plurality of user types; and
flagging a different one of the plurality of code lines based on the heatmap.

17. The computer program product of claim 13 wherein the flagging indicates that the at least one code line is under tested in response to determining that the code line usage weighting of the at least one code line is greater than the code line test coverage score of the at least one code line.

* * * * *